United States Patent [19]
Ueda

[11] Patent Number: 5,869,553
[45] Date of Patent: Feb. 9, 1999

[54] EPOXY RESIN COMPOSITION COMPRISING RED PHOSPHORUS

[75] Inventor: Shigehisa Ueda, Utsunomiya, Japan

[73] Assignee: Sumitomo Bakelite Company Limited, Tokyo, Japan

[21] Appl. No.: 762,941

[22] Filed: Dec. 10, 1996

[30] Foreign Application Priority Data

Dec. 22, 1995 [JP] Japan .................................. 7-334726

[51] Int. Cl.$^6$ .............................. C08L 63/00; C08K 3/02; C08K 3/28; H01B 3/40
[52] U.S. Cl. ............................................. 523/451; 523/208
[58] Field of Search ..................... 523/451, 208

[56] References Cited

U.S. PATENT DOCUMENTS

| | | | |
|---|---|---|---|
| 4,668,719 | 5/1987 | Kato et al. | 523/458 |
| 4,879,067 | 11/1989 | Sakon et al. | 252/609 |
| 5,360,837 | 11/1994 | Honda et al. | 523/220 |

FOREIGN PATENT DOCUMENTS

| | | |
|---|---|---|
| 63-95266 | 4/1988 | Japan . |
| 63-244835 | 10/1988 | Japan . |
| 7157542 | 6/1995 | Japan . |
| 7173372 | 7/1995 | Japan . |
| 8151427 | 6/1996 | Japan . |
| 8151505 | 6/1996 | Japan . |

*Primary Examiner*—Frederick Krass
*Attorney, Agent, or Firm*—Browdy and Neimark

[57] ABSTRACT

An epoxy resin composition for encapsulating a semiconductor, which is free from halogen and antimony and has excellent soldering crack resistance and high-temperature storage life without lowering the flame-retardancy, and which comprises as essential components (A) an epoxy resin, (B) a phenol resin curing agent, (C) a curing accelerator, (D) an inorganic filler and (E) a red phosphorus-based flame-retardant, wherein the ratio of (a) the number of epoxy groups of the epoxy resin to (b) the number of phenolic hydroxyl groups of the phenol resin curing agent [(a)/(b)] is 0.8 to 1.2, the amount of the inorganic filler (D) contained in the epoxy resin composition is 70 to 90% by weight based on the total weight of the epoxy resin composition and the cured product of the epoxy resin composition has a glass transition temperature of 100° to 160° C. and a linear expansion coefficient at 25° C. of 0.8 to $1.8 \times 10^{-5}$/°C.

11 Claims, No Drawings

EPOXY RESIN COMPOSITION COMPRISING RED PHOSPHORUS

This invention relates to an epoxy resin composition for encapsulating a semiconductor which is excellent in soldering crack resistance and high-temperature storage life.

Electronic components such as diodes, transistors, integrated circuits and the like have heretofore been encapsulated with an epoxy resin composition. This resin composition has incorporated thereinto a flame-retardant consisting of a halogen-containing flame-retardant or a combination of a halogen-containing flame-retardant with antimony trioxide, and it has been intended to make the resin composition flame-retardant by generating a halogen gas or an antimony halide gas when the component is subjected to a high temperature. However, with this resin composition, when the electronic components are exposed to a high temperature, corrosion of aluminum wirings results from the halogen ion or antimony halide ion and breakage of a bonded portion between the aluminum pad of the chip and the gold wire also results, and these have become serious problems.

For solving these problems, there have been adopted (1) a method in which an epoxy resin composition having a higher glass transition temperature than the circumstances for use of electronic components is used to inhibit the diffusion of the halogen ion or antimony halide ion during the high-temperature storage of the electronic components, thereby improving the high-temperature storage life; (2) a method in which an ion-trapping agent is added to trap the halogen ion and antimony halide ion generated during the high-temperature storage of electronic components; and (3) a method in which the two methods are combined.

Recently, the surface-mounting of electronic components and the miniaturization and thinning of electronic components have proceeded, and requirements for improving the soldering crack resistance in the mounting of electronic components on a circuit board have become greater, so that improved constructions have been desired which satisfy both soldering crack resistance and high-temperature storage life. However, when a flame-retardant system containing a halogen or a combination of a halogen and an antimony compound is used, if the glass transition temperature is as low as that of a resin system having good soldering crack resistance, the high-temperature storage life does not reach a satisfactory level even when an ion-trapping agent is added. Moreover, with a resin system having a high glass transition temperature, the desired level of soldering crack resistance is not achieved. Accordingly, there has not yet been provided an epoxy resin composition which satisfies the high-temperature storage life requirement, even when its glass transition temperature is low.

For solving the above-mentioned problems, the object of this invention is to provide, by using a red phosphorus-based flame retardant, a halogen-free and antimony-free epoxy resin composition for encapsulating a semiconductor which has excellent soldering crack resistance and high-temperature storage life without lowering the flame-retardancy.

Other objects and advantages of this invention will become apparent from the following description.

According to this invention, there is provided an epoxy resin composition for encapsulating a semiconductor, which comprises (A) an epoxy resin, (B) a phenol resin curing agent, (C) a curing accelerator, (D) an inorganic filler and (E) a red phosphorus-based flame-retardant as essential components, wherein the ratio of (a) the number of epoxy groups of the epoxy resin to (b) the number of phenolic hydroxyl groups of the phenol resin curing agent [(a)/(b)] is 0.8 to 1.2, the proportion of the inorganic filler (D) is 70 to 90% by weight based on the weight of the epoxy resin composition, the cured product of the epoxy resin composition has a glass transition temperature of 100° to 160° C. and a linear expansion coefficient at 25° C. of 0.8 to $1.8 \times 10^{-5}/°C.$, and preferably, the red phosphorus-based flame-retardant is one obtained by coating the surface of red phosphorus with an aluminum hydroxide and further coating the resulting surface with a phenol resin.

The epoxy resin (A) used in this invention includes all monomers, oligomers and polymers, each having at least two epoxy groups in one molecule, and examples thereof include biphenyl type epoxy compounds, bisphenol type epoxy compounds, stilbene type epoxy compounds, phenol novolak type epoxy resins, resol novolak type epoxy resins, triphenolmethane type epoxy compounds, alkyl-modified triphenolmethane type epoxy resins, triazine ring-containing epoxy resins and the like. These may be used alone or in admixture of two or more.

The phenol resin curing agent (B) used in this invention includes phenol novolak resins, cresol novolak resins, dicyclopentadiene-modified phenol resins, paraxylylene-modified phenol resins, terpene-modified phenol resins, triphenolmethane compounds and the like. In particular, phenol novolak resins, dicyclopentadiene-modified phenol resins and paraxylylene-modified phenol resins are preferred. These may be used alone or in admixture of two or more.

The combination of the above epoxy resin with the above phenol resin curing agent is preferably a combination of a biphenyl type epoxy compound or a cresol novolak type epoxy resin as the epoxy resin component with a paraxylylene-modified phenol resin, a phenol novolak resin or a dicyclopentadiene-modified phenol resin as the phenol resin component. Moreover, by controlling the ratio of (a) the number of epoxy groups of the epoxy resin to (b) the number of phenolic hydroxyl groups of the phenol resin curing agent in the resin composition [(a)/(b)] to 0.8–1.2, the glass transition temperature of the cured product of the resin composition becomes 100° to 160° C. which is the desired glass transition temperature. The number (a) of epoxy groups of the epoxy resin means the value obtained by dividing the weight (g) of the epoxy resin charged by 1 epoxy gram equivalent and the number (b) of phenolic hydroxyl groups of the phenol resin curing agent means a value obtained by dividing the weight (g) of the phenol resin curing agent charged by 1 hydroxyl gram equivalent. When the glass transition temperature is less than 100° C., the dimensional stability is inferior, and when the glass transition temperature exceeds 160° C., the soldering crack resistance is inferior, which is not desirable. The ratio of (a) the number of epoxy groups of the epoxy resin to (b) the number of the phenolic hydroxy groups of the phenol resin curing agent [(a)/(b)] is 0.8 to 1.2, and when the ratio is less than 0.8 or more than 1.2, there are caused disadvantages such as reduction of curability, deterioration of dimensional stability, reduction of strength and the like.

The curing accelerator (C) used in this invention may be any curing accelerator as far as it accelerates the curing reaction between the epoxy group and the phenolic hydroxyl group, and there can be widely used those which are generally used in encapsulating materials. For example, 1,8-diazabicyclo(5,4,0)undecene-7, triphenylphosphine, benzyldimethylamine, 2-methylimidazole and the like are mentioned and these may be used alone or in admixture of two or more.

As the inorganic filler (D) used in this invention, there are cited fused silica powder, crystalline silica powder, alumina, silicon nitride and the like. The proportion of the inorganic filler blended in the epoxy resin composition is 70 to 90% by weight based on the weight of the epoxy resin composition, and in view of the balance between the moldability and the soldering crack resistance, the linear expansion coefficient of the cured product of the epoxy resin composition at 25° C. must be within the range of from $0.8 \times 10^{-5}/°C$. to $1.8 \times 10^{-5}/°C$. When the linear expansion coefficient is less than $0.8 \times 10^{-5}/°C$., the curing shrinkage amount is small and hence the releasability from a mold is inferior, and on the other hand when the linear expansion coefficient exceeds $1.8 \times 10^{-5}/°C$., the soldering crack resistance is inferior, which is not desirable. Moreover, when the amount of the inorganic filler blended is less than 70% by weight, the water absorption is high and hence the soldering crack resistance is deteriorated, and on the other hand when the amount of the inorganic filler blended exceeds 90% by weight, the melt viscosity increases and hence the fluidity is deteriorated.

In this invention, the glass transition temperature and linear expansion coefficient of the cured product of the resin composition are determined as follows: A test specimen (15 mm×4 mm×3 mm) prepared by subjecting a resin composition to treatment at a temperature of 175° C. under a load of 70 Kg/cm² for 120 seconds by a low-pressure transfer molding press is heated in a thermal mechanical analysis apparatus to elevate the temperature from 0° C. at a temperature-elevating speed of 5° C./min while the dimensional changes of the test specimen with the temperature elevation were measured, and the linear expansion coefficient is determined from the tangent obtained at 25° C. and the glass transition temperature is determined from the intersecting point of the tangents obtained at 25° C. and 240° C.

The red phosphorus-based flame-retardant (E) used in this invention includes red phosphorus per se; however, this is easily oxidized and unstable, and hence, is difficult to handle. Therefore, more preferable is a red phosphorous obtained by previously coating the surface of red phosphorus with aluminum hydroxide and then further coating the resulting surface with a phenol resin. The content of red phosphorus in the coated flame-retardant is preferably 60 to 95% by weight based on the weight of the flame-retardant, and when the red phosphorus content is less than 60% by weight, it becomes necessary to incorporate a large amount of the flame-retardant into the epoxy resin composition and the addition of a large amount of the flame-retardant decreases the moisture resistance and hence is not desirable. When the content of red phosphorous exceeds 95% by weight based on the weight of the flame-retardant, there is a problem in respect of stability of red phosphorus.

The particle size of the red phosphorus-based flame-retardant is preferably such that the average particle size is 10 to 70 μm and the maximum particle size is not more than 150 μm. When the average particle size is less than 10 μm, the fluidity of the resin composition is lowered and when it exceeds 70 μm, the dispersibility of the flame-retardant is deteriorated, which is not desirable. Moreover, when the maximum particle size exceeds 150 μm, a problem is caused in respect of the fluidity of the epoxy resin composition, which is not desirable. The red phosphorus-based flame-retardant includes, for example, NOVA RED and NOVA EXCEL manufactured by Rin Kagaku Kogyo Co., Ltd. and the like and can be easily obtained from the market. The content of the red phosphorus in the epoxy resin composition is preferably 0.3 to 5% by weight based on the total weight of the epoxy resin composition, and when the red phosphorus content is less than 0.3% by weight, the flame-retardancy is insufficient. The red phosphorus-based flame-retardant is combustible and the flame-retardant per se is oxidized to develop flame-retardancy, and hence when the red phosphorus content exceeds 5% by weight, the amount of the flame-retardant becomes too large, whereby the flame-retardant serves to undesirably increase combustion, resulting in reduced flame-retardancy.

The ion-trapping agent used in this invention traps halogen ions, organic acid anions, alkali metal cations, alkaline earth metal cations and the like, to thereby reduce the amount of ionic impurities. It has been well-known that the aluminum wirings are corroded with the ionic impurities contained in the resin and the like, and the aluminum-corroding reaction is inhibited by trapping the ionic impurities. The ion-trapping agent includes $BiO_x(OH)_y(NO_3)_z$ in which $x=0.9-1.1$, $y=0.6-0.8$ and $z=0.2-0.4$; $Mg_{4.3}Al_2(OH)_{12.6}CO_3 \cdot 3.5H_2O$; $Sb_2O_5 \cdot 2H_2O$; $SbSi_vBi_wO_{x'}(OH)_{y'}(NO_3)_{z'} \cdot nH_2O$ in which $v=0.1-0.3$, $w=1.5-1.9$, $x'=4.1-4.5$, $y'=1.2-1.6$, $z'=0.2-0.3$ and $n=1-2$; and the like. Among them, more preferable are $BiO_x(OH)_y(NO_3)_z$ and $Mg_{4.3}Al_2(OH)_{12.6}CO_3 \cdot 3.5H_2O$ because they trap selectively anions. These may be used alone or in admixture of two or more. These can be easily obtained from the market. The ion-trapping agent is preferably contained in an amount of 0.2 to 2% by weight based on the total weight of the epoxy resin composition and the ion-trapping agent. When the amount is less than 0.2% by weight, the reliability lacks and when the amount exceeds 2% by weight, the flame-retardancy is deteriorated.

The epoxy resin composition of this invention comprises as essential components (A) an epoxy resin, (B) a phenol resin curing agent, (C) a curing accelerator, (D) an inorganic filler and (E) a red phosphorus-based flame-retardant, and preferably has further added thereto an ion-trapping agent. However, in addition thereto, there may be appropriately compounded, if necessary, various additives, for example, a silane coupling agent; a coloring agent such as carbon black, red iron oxide or the like; a releasing agent such as natural wax, synthetic wax or the like; a low-stress additive such as a silicone oil, a rubber or the like; etc.

Moreover, for producing the encapsulating epoxy resin composition of this invention, the above essential components and optionally the other additives can be thoroughly uniformly mixed by means of a mixer or the like, then further melt-kneaded on a hot roll or in a kneader or the like, thereafter cooled and pulverized to prepare an encapsulating material. The resin composition can be applied to coating, insulating, encapsulating or the like of electric or electronic components such as transistor, integrated circuit and the like.

By encapsulating a semiconductor element with the epoxy resin composition of this invention, a semiconductor device excellent in soldering crack resistance and high-temperature storage life can be obtained.

Examples are shown below to explain this invention in more detail. The Examples are merely by way of illustration and not by way of limitation. In the Examples and Comparative Examples, part and % are by weight unless otherwise specified.

EXAMPLE 1

Biphenyl type epoxy compound (YX4000H, a trade name of Yuka Shell Epoxy Kabushiki Kaisha) having a melting point of 105° C. and an epoxy equivalent of 195 g/eq.: 9.4 parts Paraxylylene-modified phenol resin (XL225 Series, a trade name of Mitsui Toatsu Chemicals, Inc.) having a softening point of 80° C. and a hydroxyl group equivalent of 175 g/eq.: 8.4 parts

[Number of epoxy groups of the epoxy resin (a)/number of phenolic hydroxyl groups of the phenol resin (b)=1.0]

Fused silica powder having an average particle size of 15 $\mu$m and a specific surface area of 2.2 m$^2$/g: 80.0 parts Red phosphorus-based flame-retardant (obtained by coating the surface of red phosphorus with aluminum hydroxide and then further coating the resulting surface with a phenol resin and having a red phosphorus content of 75%, an average particle size of 40 $\mu$m and a maximum particle size of 120 $\mu$m): 1.0 part 1,8-Diazabicyclo(5,4,0)undecene-7 (referred to hereinafter as DBU): 0.2 part Carbon black: 0.5 part Carnauba wax: 0.5 part All the above components were mixed in a mixer at room temperature, kneaded on a twin roll at 70°–100° C., cooled and thereafter pulverized to prepare a resin composition.

Further, the resin composition obtained was tabletted and molded at 175° C. under a load of 70 Kg/cm$^2$ for 120 seconds by means of a low-pressure transfer molding press to prepare a test specimen for flame-resistance (127 mm×12.7 mm×1.0 mm) and a test specimen for thermal mechanical analysis (TMA) (15 mm×4 mm×3 mm). Also, for a high-temperature storage life test and a soldering crack resistance test, a chip having a size of 6 mm×6 mm was encapsulated with the above resin composition at 80p QFP (80pin Quad Flat Package). The encapsulated test element was subjected to the following high-temperature storage life test and soldering crack resistance test:

Glass transition temperature and linear expansion coefficient: Using a thermal mechanical analysis apparatus, the test specimen was heated at a temperature elevation speed of 5° C./min from 0° C. while the dimensional changes with the temperature elevation were measured. From the tangent at 25° C. a linear expansion coefficient was determined, and from the intersecting point between the tangents at 25° C. and 240° C. a glass transition temperature was determined.

Soldering crack resistance: The encapsulated test element (10 packages) was allowed to stand at a high temperature at a high humidity (85° C., relative humidity of 85%, 72 hours) and thereafter immersed in a solder bath at 260° C. and then observed as to whether or not crack was caused in the package to determine the number of cracked packages.

High-temperature storage life: The encapsulated test element was allowed to stand at a high temperature (185° C.) and subjected to observation of increase of resistance value and breakage of wire to determine the time at which the increase of resistance value started.

Flame-retardancy: UL-94 vertical test (test specimen thickness: 1.0 mm)

The results of the above-mentioned tests are shown in Table 1.

EXAMPLES 2 to 5

According to the formulations shown in Table 1, the components were blended and resin compositions were obtained in the same manner as in Example 1. Test specimens and encapsulated test elements were obtained using the resin compositions obtained. The test specimens and encapsulated test elements obtained were subjected to measurement of thermal mechanical analysis, soldering crack resistance test, high-temperature storage life test and flame-resistance test in the same manner as in Example 1. The test results obtained are shown in Table 1.

Comparative Examples 1 to 6

According to the formulations shown in Table 2, the components were blended and resin compositions were obtained in the same manner as in Example 1. Using the resin compositions, test specimens and encapsulated test elements were obtained and subjected to thermal mechanical analysis, soldering crack resistance test, high-temperature storage life test and flame-resistance test in the same manner as in Example 1. The test results obtained are shown in Table 2.

The materials other than those used in Example 1 were as follows:

Orthocresol novolak type epoxy resin (softening point: 60° C., epoxy equivalent: 200 g/eq.)

Triphenolmethane type epoxy compound (melting point: 60° C., epoxy equivalent: 170 g/eq.)

Brominated epoxy resin (softening point: 65° C., epoxy equivalent: 275 g/eq.)

Phenol novolak resin (softening point: 80° C., hydroxy group equivalent: 104 g/eq.)

Fused spherical silica powder

Ion-trapping agent 1: $BiO_x(OH)_y(NO_3)_z$ in which x=0.9–1.1, y=0.6–0.8 and z=0.2–0.4

Ion-trapping agent 2: $Mg_{4.3}Al_2(OH)_{12.6}CO_3 \cdot 3.5H_2O$

Antimony trioxide

TABLE 1

| | Example | | | | |
|---|---|---|---|---|---|
| | 1 | 2 | 3 | 4 | 5 |
| Formulation (part) | | | | | |
| Biphenyl type epoxy compound | 9.4 | | 13.6 | 9.4 | 9.4 |
| o-Cresol novolak type epoxy resin | | 8.8 | | | |
| p-Xylylene-modified phenol resin | 8.4 | | 12.2 | 8.4 | 8.4 |
| Phenol novolak resin | | 4.0 | | | |
| (a)/(b) | 1.00 | 1.14 | 1.00 | 1.00 | 1.00 |
| Fused silica powder | 80.0 | | 71.5 | 79.5 | 79.5 |
| Fused spherical silica powder | | 85.0 | | | |
| Red phosphorus-based flame-retardant | 1.0 | 1.0 | 1.5 | 1.0 | 1.0 |
| DBU | 0.2 | 0.2 | 0.2 | 0.2 | 0.2 |
| Carbon black | 0.5 | 0.5 | 0.5 | 0.5 | 0.5 |
| Carnauba wax | 0.5 | 0.5 | 0.5 | 0.5 | 0.5 |
| Ion-trapping agent 1 | | | | 0.5 | |
| Ion-trapping agent 1 | | | | | 0.5 |
| Physical properties | | | | | |
| Glass transition temperature (°C.) | 105 | 155 | 109 | 106 | 107 |
| Linear expansion coefficient (×10$^{-5}$/°C.) | 1.2 | 1.0 | 1.7 | 1.2 | 1.2 |
| soldering crack | | | | | |

TABLE 1-continued

| | Example | | | | |
|---|---|---|---|---|---|
| | 1 | 2 | 3 | 4 | 5 |
| resistance (number of cracked packages/10 tested packages) | 0 | 0 | 2 | 0 | 0 |
| High-temperature storage life (hr) | 800 | 900 | 800 | 1000< | 1000< |
| Flame-resistance | V-0 | V-0 | V-0 | V-0 | V-0 |

TABLE 2

| | Comparative Examples | | | | | |
|---|---|---|---|---|---|---|
| | 1 | 2 | 3 | 4 | 5 | 6 |
| Formulation (part) | | | | | | |
| Biphenyl type epoxy compound | 8.1 | 8.1 | | | 10.3 | 4.8 |
| o-Cresol novolak type epoxy resin | | | | 19.3 | | |
| Triphenolmethane type epoxy compound | | | 12.9 | | | |
| Brominated epoxy resin | 1.5 | 1.5 | | | | |
| p-Xylylene-modified phenol resin | 8.2 | 8.2 | | | 7.6 | |
| Phenol novolak resin | | | 7.9 | 10.0 | | 2.5 |
| (a)/(b) | 1.00 | 1.00 | 1.00 | 1.00 | 1.23 | 1.02 |
| Fused silica powder | 80.0 | 79.0 | | 68.0 | 80.0 | |
| Fused spherical silica powder | | | 77.0 | | | 91.0 |
| Red phosphorus-based flame-retardant | | | 1.0 | 1.5 | 1.0 | 0.5 |
| DBU | 0.2 | 0.2 | 0.2 | 0.2 | 0.2 | 0.2 |
| Carbon black | 0.5 | 0.5 | 0.5 | 0.5 | 0.5 | 0.5 |
| Carnauba wax | 0.5 | 0.5 | 0.5 | 0.5 | 0.5 | 0.5 |
| Antimony trioxide | 1.0 | 1.0 | | | | |
| Ion-trapping agent 1 | | 1.0 | | | | |
| Physical properties | | | | | | |
| Glass transition temperature (°C.) | 105 | 105 | 182 | 160 | 87 | 108 |
| Linear expansion coefficient ($\times 10^{-5}$/°C.) | 1.2 | 1.2 | 1.4 | 1.9 | 1.2 | 0.7 |
| Soldering crack resistance (number of cracked packages/10 tested packages) | 0 | 0 | 10 | 10 | Impossible to mold | |
| High-temperature storage life (hr) | 400 | 500 | 1000 | 900 | Impossible to mold | |
| Flame-resistance | V-0 | V-0 | V-0 | V-0 | V-0 | V-0 |

What is claimed is:

1. An epoxy resin composition for encapsulating a semiconductor, which comprises as essential components (A) an epoxy resin, (B) a phenol resin curing agent, (C) a curing accelerator, (D) an inorganic filler, and (E) a red phosphorus flame retardant which has a red phosphorus core coated with aluminum hydroxide and an upper coating of a phenol resin, wherein, the ratio of (a) the number of epoxy groups of the epoxy resin to (b) the number of phenolic hydroxyl groups of the phenol resin curing agent, (a)/(b), is 0.8 to 1.2, the amount of the inorganic filler (D) contained in the epoxy resin composition is 70 to 90% by weight based on the total weight of the epoxy resin composition, the cured product of the epoxy resin composition has a glass transition temperature of 100° to 160° C. and a linear expansion coefficient at 25° C. of 0.8 to $1.8 \times 10^{-5}$/°C., and said red phosphorous flame retardant constitutes means for increasing high-temperature storage life of a semiconductor encapsulated by said composition.

2. The epoxy resin composition for encapsulating a semiconductor according to claim 1, wherein the red phosphorus flame-retardant (E) is one obtained by coating the surface of red phosphorus with aluminum hydroxide and then further coating the resulting surface with a phenol resin, the red phosphorus content in the red phosphorus flame-retardant (E) is 60 to 95% by weight based on the weight of the red phosphorus flame-retardant, and the red phosphorus flame-retardant (E) has a maximum particle size of 150 μm or less.

3. The epoxy resin composition for encapsulating a semiconductor according to claim 2, which further contains an ion-trapping agent in an amount of 0.2 to 2% by weight based on the total weight of the trapping agent and the epoxy resin composition.

4. The epoxy resin composition for encapsulating a semiconductor according to claim 3, wherein the ion-trapping agent is $BiO_x(OH)_y(NO_3)_z$ in which x=0.9–1.1, y=0.6–0.8 and z=0.2–0.4 or $Mg_{4.3}Al_2(OH)_{12.6}CO_3 \cdot 3.5H_2O$ or a combination of the two.

5. The epoxy resin composition for encapsulating a semiconductor according to claim 1, which further contains an ion-trapping agent in an amount of 0.2 to 2% by weight based on the total weight of the trapping agent and the epoxy resin composition.

6. The epoxy resin composition for encapsulating a semiconductor according to claim 5, wherein the ion-trapping agent is $BiO_x(OH)_y(NO_3)_z$ in which x=0.9–1.1, y=0.6–0.8 and z=0.2–0.4 or $Mg_{4.3}Al_2(OH)_{12.6}CO_3 \cdot 5H_2O$ or a combination of the two.

7. The epoxy resin composition of claim 2, wherein said red phosphorus flame retardant has an average particle size of 10 to 70 μm.

8. The epoxy resin composition of claim 3, wherein said red phosphorus flame retardant has an average particle size of 10 to 70 μm.

9. The epoxy resin composition of claim 4, wherein said red phosphorus flame retardant has an average particle size of 10 to 70 μm.

10. The epoxy resin composition of claim 5, wherein said red phosphorus flame retardant has an average particle size of 10 to 70 μm.

11. The epoxy resin composition of claim 6, wherein said red phosphorus flame retardant has an average particle size of 10 to 70 μm.

* * * * *